United States Patent
Van Den Neste et al.

(10) Patent No.: US 6,884,472 B2
(45) Date of Patent: Apr. 26, 2005

(54) PROCESS FOR FORMING A VITREOUS LAYER ON A REFRACTORY SURFACE

(75) Inventors: Marc Van Den Neste, Villers-la-Ville (BE); Jean-Pierre Robert, Villers-Perwin (BE); Laurent Delmotte, Meeffe (BE)

(73) Assignee: Glaverbel, Brussels (BE)

( * ) Notice: Subject to any disclaimer, the term of this patent is extended or adjusted under 35 U.S.C. 154(b) by 7 days.

(21) Appl. No.: 10/296,180

(22) PCT Filed: May 28, 2001

(86) PCT No.: PCT/BE01/00094

§ 371 (c)(1),
(2), (4) Date: Nov. 22, 2002

(87) PCT Pub. No.: WO02/102739

PCT Pub. Date: Dec. 27, 2002

(65) Prior Publication Data

US 2004/0105984 A1 Jun. 3, 2004

(30) Foreign Application Priority Data

May 24, 2000 (EP) .............................. 00201815

(51) Int. Cl.⁷ .............................. C23C 4/10; C23C 4/12
(52) U.S. Cl. ....................................... 427/453; 427/456
(58) Field of Search ................................ 427/453, 456; 428/446, 454, 426, 427, 428

(56) References Cited

U.S. PATENT DOCUMENTS 3,443,754 A * 5/1969 Charlop ...................... 239/85
3,800,983 A * 4/1974 Brichard et al. ............... 222/52
4,363,443 A 12/1982 Huehne
5,269,462 A * 12/1993 Suzon et al. .................. 239/83
RE34,785 E * 11/1994 Virey ............................ 65/26

FOREIGN PATENT DOCUMENTS

| DE | 3 803 047 A1 | 8/1988 |
| DE | 38 03 047 A1 * | 8/1988 |
| EP | 0 773 203 A1 | 5/1997 |
| EP | 0 908 428 A1 | 4/1999 |
| GB | 2 035 524 A * | 6/1980 |
| JP | 58-33189 | 2/1983 |
| WO | WO 97/28099 | 8/1997 |
| WO | 97/28099 * | 8/1997 |
| WO | WO 98/46367 | 10/1998 |

* cited by examiner

*Primary Examiner*—Katherine Bareford
(74) *Attorney, Agent, or Firm*—Jerold I. Schneider; DLA Piper Rudnick Gray Cary US LLP

(57) ABSTRACT

A process for forming a vitreous layer on a refractory surface, in which a vitrifying agent is projected by means of an apparatus against the surface with an oxygen-containing carrier gas and simultaneously with a combustible gas, the latter generating a combustion flame, characterized in that the vitrifying agent comprises particles of cullet and in that the flame generated provides, at least partially, the heat needed to form the vitreous layer on the surface. The vitreous layer thus formed makes it possible to prevent the build-up, on the refractory walls of high-temperature ovens, of dust or by-products coming from the raw materials and/or their reaction products.

36 Claims, 1 Drawing Sheet

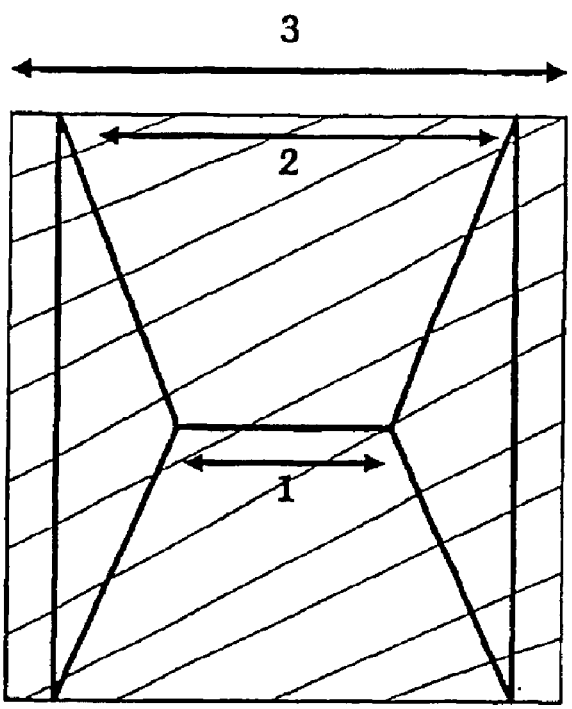
Figure I
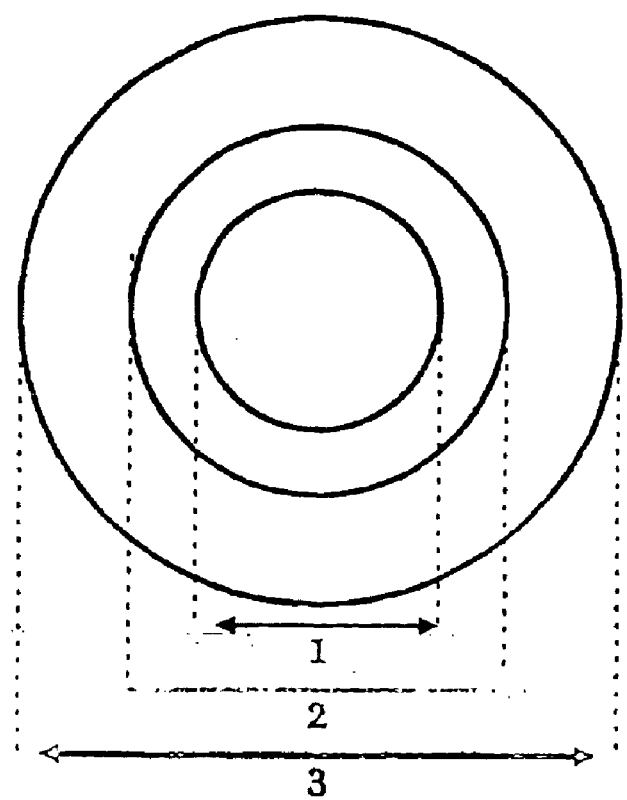
Figure II

PROCESS FOR FORMING A VITREOUS LAYER ON A REFRACTORY SURFACE

CROSS REFERENCE TO RELATED APPLICATIONS

This application is the U.S. National Stage of International Application No. PCT/BEO1/00094 filed 28 May, 2001, and claims the priority of European Application No. 00201815.8 filed 24 May 2000. The entirety of each of those applications is incorporated herein by reference.

BACKGROUND OF THE INVENTION

The present invention relates to a process for forming a vitreous layer on a refractory surface, in which a vitrifying agent is projected by means of an apparatus against the said surface with an oxygen-containing carrier gas and simultaneously with a combustible gas, the latter generating a combustion flame.

High-temperature furnaces used for various industrial applications may be subjected to a certain amount of degradation over time. It is found that dust or by-products coming from the raw materials and/or from their reaction products accumulate on the various refractory surfaces of the furnace. This-phenomenon is particularly important in coke ovens where the combustion of coal generates the formation of graphite carbon on the refractory surfaces and into the thickness of the refractories, where it may cause cracking. This carbon builds up particularly in the region of the feeding ports, the roof, the flue of the oven and the space between the door and the jambs. Not only does this build-up embrittle the refractory materials but it also decreases the level of charging of the oven. In addition, the cracking is a source of pollution. It is also observed that the mechanical extraction of the coke is made more difficult because of the friction existing between the coke and the graphite carbon deposited on the refractory surfaces. The build-up of graphite carbon in the charging ports also slows down the rate of charging of the oven.

Currently, in order to remove the graphite carbon it is necessary to stop the oven and burn off the graphite carbon to generate $CO_2$. This process, given its slowness, results in the loss of productivity and, moreover, can create local overheating in the refractory bricks, something which may in course of time damage the oven. In the feeding ports, mechanical cleaning is sometimes necessary in order to remove the graphite carbon, which most particularly damages them.

Patent Application EP 908 428 A1 (Kawasaki Steel Corporation) proposes the application in the carbonizing chamber of the oven of a vitrifying agent containing predominantly silica and/or $Na_2O$ and to prevent the graphite carbon from adhering to the exposed surfaces. The process involves spraying an aqueous solution or a suspension in water of this agent onto a surface while maintaining the temperature of the latter at 900° C. or more for at least 30 minutes.

Patent Application EP 773 203 A1 (Asahi Chemical Company) describes a similar process for forming a layer of metal oxides on the walls of a coke oven. The process consists in the hot application, using conventional methods, of an aqueous solution or a suspension in water of metal oxide precursors.

In both these methods, the water which comes into contact with the hot refractory surface causes a thermal shock which embrittles the refractory bricks. Silica, of which the refractory bricks are composed, contains a small amount of lime (CaO) which, in the presence of water, is converted into hydrated lime ($Ca(OH)_2$) This hydration causes these bricks to crumble.

The vitreous layers formed according to these processes are generally very thin and tend to wear away rapidly.

Patent Application JP 58-33189 (Kurosaki & Nippon Steel) describes the formation of a vitreous coating for repairing the walls of coke ovens by flame-spraying a mixture of vitrifiable oxides. The layer thus formed tends to crystallize over time, which causes it to crack. To remedy this drawback, Patent Application DE 38 03 047 A1 (Kurosaki & Nippon Steel) describes the formation of a vitreous coating having a high silica content which contains, during its formation, at least 60% of a crystalline phase.

SUMMARY OF THE INVENTION

One of the objects of the present invention is to solve the various problems mentioned.

The present invention relates to a process for forming a vitreous layer on a refractory surface, in which a vitrifying agent is projected by means of an apparatus against the said surface with an oxygen-containing carrier gas and simultaneously with a combustible gas, the latter generating a combustion flame, characterized in that the vitrifying agent comprises particles of cullet and in that the flame generated provides, at least partially, the heat needed to form the vitreous layer on the surface.

With respect to the spraying of a mixture of vitrifiable oxides, the present process has the advantage of requiring less energy to melt the raw material particles, and consequently provides a higher rate of application. It also allows the addition of oxide particles which keep their individuality in the layer, which thus benefits from a higher mechanical strength.

The advantage of such a process is also that the vitrifying agent does not need to be dissolved or put into suspension in water. Furthermore, the heat released by the flame generated by the combustion of the combustible gas makes it possible to obtain a vitreous layer without necessarily working on a hot surface. This heat also makes it possible to obtain a layer which is molten at the temperature of the flame, but is mechanically resistant at the operating temperature of the oven.

Preferably, the vitrifying agent is projected by means of an apparatus comprising a tubular lance having a central duct, via which the vitrifying agent and the oxygen-containing gas are delivered, and one or more peripheral ducts via which the combustible gas is delivered.

The combustible gas burns in contact with an oxygen-containing gas. The combustible gas can generate the flame when it comes into contact at the outlet of the lance with the oxygen-containing carrier gas which serves to project the vitrifying agent. Oxygen-containing gas may also be, and preferably, is introduced into and mixed with the combustible gas in the peripheral duct or ducts so as to generate a flame at the outlet of the lance.

Preferably, the carrier gas is oxygen, that is to say pure oxygen of industrial quality, while the combustible gas is propane, acetylene or tetrene®, which is a propylene-based gas. These various combustible gases, and particularly acetylene or tetrene®, make it possible to obtain a high flame temperature, possibly above 2 000° C.

The apparatus used to project the vitrifying agent preferably comprises a single tubular lance, which makes it easier to apply the vitreous layer locally to the regions most exposed to graphite carbon deposition. The apparatus is preferably the lance described in Patent Application WO 98/46 367 A1 (Glaverbel) by means of which the vitrifying agent is sprayed simultaneously with flame generation.

BRIEF DESCRIPTION OF THE DRAWINGS

In the drawings, FIG. I is a vertical section through a convergent/divergent nozzle and FIG. II is a cross-section of a convergent/divergent nozzle.

DETAILED DESCRIPTION

The tubular lance used to project the vitrifying agent may be fitted with a duck-bill nozzle or with a convergent/divergent nozzle. FIG. I is a vertical section through a convergent/divergent nozzle and FIG. II is a cross section through this nozzle. This nozzle has a central diameter 1, an outlet diameter 2 and an external diameter 3. The central diameter is, for example, at least 8 mm and at most 12 mm (1, FIGS. I and II). Using such a nozzle makes it possible to deposit a vitreous layer over a larger refractory surface than that involving the use of cylindrical nozzles, while still maintaining identical the other projection parameters. If, by way of example, the vitrifying agent is projeted from a lance placed at a distance of 60 mm from the refractory surface, the surface covered by a convergent/divergent nozzle having a central diameter of 12 mm is at least 10 times larger than that covered by a cylindrical nozzle having a central diameter of 12 mm.

The duck-bill nozzle terminates in a slot and allows strips of vitreous material to be deposited, for example strips having a width of about 200 mm using a lance whose central tube has a diameter of 16 mm, when the nozzle is located at 60 mm from the substrate.

The lance will be placed at a maximum distance of 100 mm and preferably at a distance of 60 mm from the surface onto which the vitrifying agent is projected.

The vitrifying agent comprises cullet, such as borosilicate cullet, and/or soda-lime cullet. The latter has the advantage of being easily available, inexpensive and easy to melt. The cullet will preferably contain, by weight, 55%–75% $SiO_2$, 0%–10% $Al_2O_3$, 0%–15% $B_2O_3$, 0%–16% CaO, 0%–10% MgO, 0%–20% $Na_2O$, 0%–10% $K_2O$, 0%–10% BaO, 0%–10% SrO, 0%–5% $ZrO_2$.

The soda-lime cullet will preferably contain, by weight, 55%–75% $SiO_2$, 0%–7% $Al_2O_3$, 0%–5% $B_2O_3$, 0%–16% CaO, 0%–10% MgO, 10%–20% $Na_2O$, 0%–10% $K_2O$, 0%–10% BaO, 0%–10% SrO, 0%–5% $ZrO_2$ and, optionally, colouring agents.

The borosilicate cullet will preferably contain, by weight, 55%–75% $SiO_2$, 0%–10% $Al_2O_3$, 0%–10% CaO, 0%–10% $Na_2O$, 0%–5% $K_2O$, 5%–15% $B_2O_3$ and, optionally, minor constituents such as $TiO_2$, BaO, ZnO and $Fe_2O_3$.

The cullet particles generally have a diameter of less than 2 000 μm and preferably less than 600 μm. It is in fact important for the cullet particles not to be too large so as to form a homogeneous vitreous layer and so as to melt easily.

The vitrifying agent may also contain, in addition to the cullet, certain additives such as metal oxides and/or metals. These additives make it possible to obtain a vitreous layer having a higher melting point than when they are not present. Moreover, if the metal or metals present burn, the heat released by their combustion combined with the heat of the flame generated by combustion of the combustible gas makes it possible to cover surfaces whose temperature is lower than when one works without these metals. Prefarably, the vitrifying agent contains at least 40% by weight of cullet, allowing a low permeability of the formed layer.

The metal oxide particles have a diameter of less than or equal to 2 000 μm and the metal particles have a diameter of less than or equal to 50 μm. These particle sizes favour the formation of a homogeneous vitreous layer. Furthermore, the smaller the diameter of the metal particles the greater their reactivity. Moreover, since the thickness of the vitreous layer formed is proportional to the size of the oxide particles, it is preferable for this not to be too great so as not to modify in the course of time; the rate of charging of the oven. The thickness of the vitreous layer will preferably vary from a minimum of 0.1 mm to a maximum of 5 mm.

The vitrifying agent may contain various metal oxides among which zirconium oxide ($ZrO_2$), alumina ($Al_2O_3$) or titanium oxide ($TiO_2$), or oxide mixtures such as AZS (a refractory product containing $Al_2O_3$, $ZrO_2$ and $SiO_2$), will be preferred. AZS is supplied in the form of the ground refractory product.

$ZrO_2$ is reputed to be a "neutral" element and therefore does not carry the risk of giving rise to reactions other than those intended for forming the vitreous layer on the refractory surface. Furthermore, the presence of $ZrO_2$ improves the thermal properties of the vitreous layer at high temperature. $ZrO_2$ may be provided in the form of particles of refractory material such as AZS.

AZS contains a vitreous phase which will enrich, with zirconia and alumina, the vitreous layer formed and will improve its thermomechanical properties.

$Al_2O_3$ has the properties of being very wear-resistant and abrasion-resistant. Alumina can also diffuse into the glass, thereby increasing its thermal resistance. It has also been noted that the vitreous layers formed using a vitrifying agent comprising cullet and alumina are in general less porous. The alumina can be supplied in the form of kaolin.

$TiO_2$ can act as a catalyst for the oxidation of carbon. In this way, it will be even more difficult for carbon to build up on the refractory surface of the oven.

The vitrifying agent may contain various metals preferably chosen from aluminium and silicon. Although silicon is generally classed as a semi-metal, it will be regarded here as a metal since within the content of the present invention it behaves like the other metals. The presence of metal tends to facilitate the penetration of the metal oxide into the vitreous layer, making it smoother and more resistant at high temperature. The unburned metal particles oxidize during operation of the oven and thereby increase the temperature and facilitate the oxidation of carbon. Silicon or aluminium oxidizing in the vitreous layer increase its viscosity. Aluminium has the particular feature of oxidizing easily, releasing a large amount of heat, which makes it even easier to form the vitreous layer.

The vitrifying agent is projected onto a surface having a temperature of between 20° C. and 1 400° C. Above 1 400° C., the vitreous layer starts to melt and no longer adheres to the surface onto which it is projected. In one particular application of the process, the vitrifying agent is sprayed onto a surface having a temperature of between 800° C. and 1 100° C. This temperature range is usually encountered in the field of coke ovens in which the problem of graphite carbon deposition on the internal surfaces is most frequent. It is possible to treat an oven locally, for example at the feeding ports, but also over the entire internal surface of the oven.

The vitreous layer obtained according to the present invention has a degree of permeability. The higher the permeability, the more porous the vitreous layer. The lower the permeability, the greater the sealing provided by the vitreous layer. If the permeability is high, graphite carbon can infiltrate the pores of the vitreous layer and little by little will build up on the refractory layer.

The permeability of a material, defined according to the standard III.13 (PRE/R 16) 78, p. 1 communicated to the ISO/TC33, is the property that refractory materials have of being penetrated by a gas due to the effect of a pressure difference.

It is represented by $\mu$, contained in the following formula, which expresses the volume of gas passing through a given material in a given time:

$$V/t = \mu \cdot (1/\eta) \cdot (S/L) \cdot (p_1 - p_2) \cdot (p_1 + p_2)/2p$$

where V=volume of gas at an absolute pressure p passing through the material in a time t;
S=flow cross section of the material;
L=thickness of the material penetrated;
$P_1$=absolute pressure at the gas inlet;
$P_2$=absolute pressure at the gas outlet;
p=pressure at which the gas that has flowed is measured;
$\eta$=dynamic viscosity of the gas at the test temperature.

In the rest of the text, the permeability will be expressed in nanoperms (nP). One nanoperm is equal to $10^{-13}$ m$^2$.

The permeability will preferably have a value of less than that of the permeability of the refractory surface, the latter generally having a permeability value of between 5 nanoperms and 15 nanoperms.

The present invention will be illustrated in greater detail with the aid of the examples which follow.

EXAMPLE 1

A lance fitted with a convergent/divergent nozzle was used to project the vitrifying agent composed, by weight, of 40% cullet, containing, by weight, 70.5%–71.5% $SiO_2$, 9.5%–9.6% CaO, 13.8%–14.0% $Na_2O$, 0.58%–0.63% $Al_2O_3$ and 0.7%–0.9% $Fe_2O_3$, and 60% tabular alumina (98.3% of the alumina particles had a diameter of between 180 $\mu$m and 600 $\mu$m). The substrate consisted of silica bricks.

The lance used in this example is identical, except for the shape of the nozzle, to that described in Patent Application WO 98/46 367 A1 (Glaverbel) and had a central duct and several peripheral ducts. The vitrifying agent was projected by means of the central duct, in the presence of oxygen, at the same time as propane and oxygen were projected separately by means of the peripheral ducts. The vitrifying agent was projected with a mass flow rate of 27 kg/h. The oxygen serving as carrier gas had a flow rate of 24 m$^3$/h. The oxygen and propane pressures in the peripheral ducts were 4 bar and 2 bar, respectively. The combustion of the propane with oxygen, which took place at the outlets of these peripheral ducts, generated a flame.

The refractory surface was swept by the lance, keeping a distance of 60 mm from it, and at an angle of 90° to this surface. The mixture was projected with a velocity of about 150 km/h and the projection time was 10 s/dm$^2$ of refractory surface. The latter had a temperature of 1 100° C.

Two measurements of the permeability of the surface after it had cooled were taken. One measurement was taken right after application of the vitreous layer and the other after 48 hours had elapsed at a temperature of 1 100° C. The latter measurement made it possible to check; the flow of the vitreous layer over the wall. Should the vitreous layer flow, the permeability becomes higher.

The permeability of the surface covered with the vitreous layer was measured immediately after this layer was applied and cooled and it had a value of 0.24 nanoperms. The permeability of this same surface after 48 h of ageing at 1 100° C., followed by its cooling, was 0.4 nanoperms.

As a variant, the silica bricks were replaced with chamotte bricks. A similar result was obtained.

EXAMPLES 2 to 15

We now illustrate in Table 1 other embodiments of the invention.

In Examples 2 to 14, the carrier gas was pure oxygen of industrial quality and the combustible gas was propane. In Example 15, the oxygen-containing carrier gas was dry air.

In Examples 2 to 7, the oxygen-containing, carrier gas had a flow rate of 22 m$^3$/h and in Examples 8 to 15 it was 24 m$^3$/h.

The alumina used in Examples 8, 9 and 14 was the same as that used in Example 1, whereas that used in Example 15 was electrocast alumina P120 (the diameter of the alumina particles was less than 150 $\mu$m).

The zirconium oxide used in Examples 6, 7 and 10–13 may have a maximum content of 6% by weight of CaO serving as stabilizing agent.

Unless otherwise specified in Table 1, the other parameters were identical to those in Example 1.

For a refractory surface at the same temperature, it may be seen that the vitreous layer resulting from projecting a vitrifying agent containing cullet and an additive (Examples 4–12) is less permeable than the vitreous layer resulting from projecting a vitrifying agent containing 100 cullet (Examples 2 and 3).

It may be noted that lower permeability values are obtained when the cullet content is at least 40% by weight (Examples 2 to 12).

EXAMPLE 16

A lance similar to that described in Example 1 was used to project a mixture of particles containing, by weight 55% soda-lime cullet similar to that in Example 1, 29% alumina, 10% ground AZS refractory and 6% aluminium. The maximum size of the cullet particles was 1 mm. The maximum size of the alumina particles was 600 $\mu$m. The maximum size of the AZS particles was 500 $\mu$m. The size of the aluminium particles did not exceed 45 $\mu$m.

The mixture was projected onto chamotte bricks placed in the inner wall of a coke oven at a point where the wall temperature is 1 250° C. The mixture was sprayed at a rate of 42 kg/h into oxygen having a flow rate of 19 Nm$^3$/h. The oxygen pressure and the propane pressure in the peripheral ducts were 3.2 bar and 1.6bar, respectively. The vitreous layer formed at a rate of about 0.05 m$^2$/minute.

The permeability of the surface covered with the vitreous layer was 0.35 nanoperm after 7 days at 1 250° C.

EXAMPLES 17 to 22

Table 2 illustrates further examples using other particle mixtures, in which the projection parameters and the particle sizes were those of Example 16.

The silicon particles had a size of less than 45 $\mu$m.
The zircon particles had a maxium size of 1 mm.
Examples 19 to 22 used a borosilicate cullet the maximum particle size of which was 1 mm. This cullet was mainly composed, by weight, of 65.8% $SiO_2$ 5.1% $Al_2O_3$, 7.2% $Na_2O$, 2.1% $K_2O$, 1.5% $TiO_2$, 14.3% $B_2O_3$ and 1.4% BaO.

The surface on which the vitreous layer was formed was at 1 200° C. in Example 17 and at 1 250° C. in Examples 18 to 22. The substrate consisted of chamotte bricks but a similar result was found when the substrate consisted of silica bricks.

TABLE 1

| Conditions | Examples | | | | | | | | | | | | | |
|---|---|---|---|---|---|---|---|---|---|---|---|---|---|---|
| | 2 | 3 | 4 | 5 | 6 | 7 | 8 | 9 | 10 | 11 | 12 | 13 | 14 | 15 |
| Percentage of cullet | 100 | 100 | 95 | 95 | 90 | 90 | 80 | 60 | 80 | 60 | 40 | 20 | 38 | 50 |
| Diameter of the cullet particles ($\mu$m) | <355 | <355 | <355 | <355 | <355 | <355 | <355 | <355 | <355 | <355 | <355 | <355 | <425 | <425 |
| Metal oxide | / | / | $TiO_2$ | $TiO_2$ | $ZrO_2$ | $ZrO_2$ | $Al_4O_3$ | $Al_2O_3$ | $ZrO_2$ | $ZrO_2$ | $ZrO_2$ | $ZrO_2$ | $Al_2O_3$ | $Al_2O_3$ |
| Percentage of metal oxide | / | / | 5 | 5 | 10 | 10 | 20 | 40 | 20 | 40 | 60 | 80 | 50 | 50 |
| Metal | / | / | / | / | / | / | / | / | / | / | / | / | Si/Al | / |
| Percentage of metal | / | / | / | / | / | / | / | / | / | / | / | / | 7/5 | / |
| Temperature of the refractory surface (° C.) | 1 100 | 800 | 1 100 | 800 | 1 100 | 800 | 1 100 | 1 100 | 1 100 | 1 100 | 1 100 | 1 100 | 1 100 | 1 100 |
| Permeability | 1.00 | 0.32 | 0.11 | 0.05 | 0.27 | 0.05 | 0.10 | 0.83 | 0.38 | 0.17 | 0.21 | 1.57 | 2.78 | 2.39 |
| Permeability after 48 h at 1 100° C. | 2.96 | 1.69 | 2.69 | 1.74 | 1.23 | 2.69 | 0.56 | 2.74 | 2.17 | 1.10 | 2.19 | 26.77 | / | / |
| Permeability after 24 h at 1 100° C. | / | / | / | / | / | / | / | / | / | / | / | / | 3.46 | 5.06 |

TABLE 2

| Conditions | Examples | | | | | |
|---|---|---|---|---|---|---|
| | 17 | 18 | 19 | 20 | 21 | 22 |
| Percentage of soda-lime cullet | 60 | 55 | 28 | | | |
| Percentage of borosilicate cullet | / | / | 27 | 55 | 55 | 55 |
| Metal oxide | $Al_2O_3$ | $Al_2O_3$ | $Al_2O_3$ | $Al_2O_3$ | $Al_2O_3$ | $Al_2O_3$ |
| Metal oxide | | | | | AZS | $ZrO_2.SiO_2$ |
| Percentage of metal oxides | 34 | 25 | 35 | 25 | 29/10 | 24/15 |
| Metal | Al | Al | Al | Al | Al | Al |
| Metal | | Si | | | | |
| Percentage of metal | 6 | 6/14 | 10 | 20 | 6 | 6 |
| Temperature of the refractory surface (° C.) | 1 200 | 1 250 | 1 250 | 1 250 | 1 250 | 1 250 |
| Permeability after 7 days at 1 250° C. | 0.77 | 0.77 | 0.93 | 1.48 | 1.03 | 0.9 |

What is claimed is:

1. Process for forming a vitreous layer on a refractory surface, in which a vitrifying agent is projected by means of an apparatus against the said surface with an oxygen-containing carrier gas and simultaneously with a combustible gas, the latter generating a combustion flame, the vitrifying agent including particles of borosilicate cullet and the flame generated providing, at least partially, the heat needed to form the vitreous layer on the surface.

2. Process for forming a vitreous layer according to claim 1, including at least one of the following features (A) through (F):

(A) the carrier gas is oxygen;
(B) the combustible gas is selected from the group consisting of propane and acetylene;
(C) the cullet particles have a diameter of less than 2000 microns;
(D) the vitrifying agent comprises cullet and at least one additive;
(E) the vitrifying agent is projected onto a surface having a temperature of between 20 degrees and 1400 degrees Celsius;
(F) the refractory surface forms part of a coke oven.

3. Process for forming a vitreous layer according to claim 2, and including at least two of the aforementioned features (A) through (F).

4. Process for forming a vitreous layer according to claim 2, and including at least three of the aforementioned features (A) through (F).

5. Process for forming a vitreous layer according to claim 2, wherein feature (D) is included and further characterized by at least one of the following features (G) through (I):

(G) the vitrifying agent contains at least 40% by weight of cullet;
(H) at least one additive is a metal oxide;
(I) at least one additive is a metal.

6. Process for forming a vitreous layer according to claim 5, wherein feature (H) is included and wherein the diameter of the metal oxide particles does not exceed 2000 microns.

7. Process for forming a vitreous layer according to claim 6, wherein feature (H) is included and wherein the metal oxide is at least one of $Al_2O_3$, $ZrO_2$, ground AZS refractory, and $TiO_2$.

8. Process for forming a vitreous layer according to claim 5, wherein feature (I) is included, and wherein the diameter of the metal particles does not exceed 50 microns.

9. Process for forming a vitreous layer according to claim 5, wherein feature (I) is included, and wherein the metal is at least one of aluminum and silicon.

10. Process for forming a vitreous layer according to claim 5, including all of the features (G) through (I).

11. Process for forming a vitreous layer according to claim 1, wherein the borosilicate cullet contains, by weight, 55%–75% $SiO_2$, 0%–10% $Al_2O_3$, 0%–10% CaO, 0%–10% $Na_2O$, 0%–5% $K_2O$, and 5%–15% $B_2O_3$.

12. Process for forming a vitreous layer according to claim 11, wherein the borosilicate cullet further includes one or more of $TiO_2$, BaO, ZnO and $Fe_2O_3$.

13. Process for forming a vitreous layer according to claim 1, characterized by at least one of the following features (A) through (B):
 (A) the vitrifying agent is projected by means of an apparatus comprising a single tubular lance having a central duct, via which the vitrifying agent and the oxygen-containing carrier gas are delivered, and at least one peripheral duct via which the combustible gas is delivered;
 (B) the vitrifying agent is sprayed by means of an apparatus comprising a lance fitted with a convergent/divergent nozzle.

14. Process for forming a vitreous layer according to claim 13, wherein feature (B) is included and wherein the lance is placed at a distance of less than 100 mm from the refractory surface.

15. Process for forming a vitreous layer according to claim 1, characterized in that the cullet particles have a diameter of less than 600 microns.

16. Process for forming a vitreous layer according to claim 1, characterized in that the vitrifying agent is projected onto a surface having a temperature of between 800 degrees and 1100 degrees Celsius.

17. Process for forming a vitreous layer on a refractory surface, in which a vitrifying agent is projected by means of an apparatus against the said surface with an oxygen-containing carrier gas and simultaneously with a combustible gas, the latter generating a combustion flame, the vitrifying agent including particles of soda-lime cullet containing, by weight, 55%–75% $SiO_2$, 0%–7% $Al_2O_3$, 0%–5% $B_2O_3$, 0%–16% CaO, 0%–10% MgO, 10%–20% $Na_2O$, 0%–10% $K_2O$, 0%–10% BaO, 0%–10% SrO, 0%–5% $ZrO_2$, and the flame generated providing, at least partially, the heat needed to form the vitreous layer on the surface.

18. Process for forming a vitreous layer according to claim 17, wherein the soda-lime cullet further includes coloring agents.

19. Process for forming a vitreous layer according to claim 17, characterized by at least one of the following features (A) through (F):
 (A) the carrier gas is oxygen;
 (B) the combustible gas is selected from the group consisting of propane and acetylene;
 (C) the cullet particles have a diameter of less than 2000 microns;
 (D) the vitrifying agent comprises cullet and at least one additive;
 (E) the vitrifying agent is projected onto a surface having a temperature of between 20 degrees and 1400 degrees Celsius;
 (F) the refractory surface forms part of a coke oven.

20. Process for forming a vitreous layer according to claim 19, and including at least two of the aforementioned features (A) through (F).

21. Process for forming a vitreous layer according to claim 19, and including at least three of the aforementioned features (A) through (F).

22. Process for forming a vitreous layer according to claim 19, wherein feature (D) is included and characterized by at least one of the following features (G) through (I):
 (G) the vitrifying agent contains at least 40% by weight of cullet;
 (H) at least one additive is a metal oxide;
 (I) at least one additive is a metal.

23. Process for forming a vitreous layer according to claim 22, wherein feature (H) is included and wherein the diameter of the metal oxide particles does not exceed 2000 microns.

24. Process for forming a vitreous layer according to claim 23, wherein feature (H) is included and wherein the metal oxide is at least one of $Al_2O_3$, $ZrO_2$, ground AZS refractory, and $TiO_2$.

25. Process for forming a vitreous layer according to claim 22, wherein feature (I) is included, and wherein the diameter of the metal particles does not exceed 50 microns.

26. Process for forming a vitreous layer according to claim 22, wherein feature (I) is included, and wherein the metal is at least one of aluminum and silicon.

27. Process for forming a vitreous layer according to claim 22, including all of the features (G) through (I).

28. Process for forming a vitreous layer according to claim 17, characterized by at least one of the following features (A) through (B):
 (A) the vitrifying agent is projected by means of an apparatus comprising a single tubular lance having a central duct, via which the vitrifying agent and the oxygen-containing carrier gas are delivered, and at least one peripheral duct via which the combustible gas is delivered;
 (B) the vitrifying agent is sprayed by means of an apparatus comprising a lance fitted with a convergent/divergent nozzle.

29. Process for forming a vitreous layer according to claim 28, wherein feature (B) is included and wherein the lance is place at a distance of less than 100 mm from the refractory surface.

30. Process for forming a vitreous layer according to claim 17, characterized in that the cullet particles have a diameter of less than 600 microns.

31. Process for forming a vitreous layer according to claim 17, characterized in that the vitrifying agent is projected onto a surface having a temperature of between 800 degrees and 1100 degrees Celsius.

32. Process for forming a vitreous layer according to claim 7, wherein the vitrifying agent is projected by means of an apparatus comprising a single tubular lance having a central duct, via which the vitrifying agent arid the oxygen-containing carrier gas are delivered, and one or more pheripheral ducts in which an oxygen-containing gas is mixed with the combustible gas.

33. Process for forming a vitreous layer on a refractory surface, in which a vitrifying agent is projected by means of an apparatus against the said surface with an oxygen-containing carrier gas and simultaneously with a combustible gas, the latter generating a combustion flame, wherein the vitrifying agent comprises particles of cullet and in that the flame generated provides, at least partially, the heat needed to form the vitreous layer on the surface, characterized by the following features (A) through (G):
 (A) the carrier gas is oxygen;
 (B) the combustible gas is selected from the group consisting of propane and acetylene;
 (C) the vitrifying agent comprises at least one of soda-lime cullet and borosilicate cullet;
 (D) the cullet particles have a diameter of less than 2000 microns;
 (E) the vitrifying agent comprises cullet and at least one additive;

(F) the vitrifying agent is projected onto a surface having a temperature of between 20 degrees and 1400 degrees Celsius;

(G) the refractory surface forms part of a coke oven.

34. Process for forming a vitreous layer according to claim 33, wherein the vitrifying agent is projected by means of an apparatus comprising a single tubular lance having a central duct, via which the vitrifying agent and the oxygen-containing carrier gas are delivered, and one or more peripheral ducts in which an oxygen-containing gas is mixed with combustible gas.

35. Process for forming a vitreous layer according to claim 33, characterized in that the cullet particles have a diameter of less than 600 microns.

36. Process for forming a vitreous layer according to claim 33, characterized in that the vitrifying agent is projected Onto a surface having a temperature of between 800 degrees and 1100 degrees Celsius.

* * * * *